No. 710,504. Patented Oct. 7, 1902.
L. NEWMAN.
MACHINE FOR HEMMING GARMENTS.
(Application filed Mar. 29, 1901.)
(No Model.) 8 Sheets—Sheet 1.

Fig.1.

WITNESSES: INVENTOR:
Leopold Newman
By Kay & Totten
ATTORNEYS

No. 710,504. Patented Oct. 7, 1902.
L. NEWMAN.
MACHINE FOR HEMMING GARMENTS.
(Application filed Mar. 29, 1901.)
(No Model.) 8 Sheets—Sheet 3.

FIG. 3.

WITNESSES:

INVENTOR:
Leopold Newman
By Kay & Totten
ATTORNEYS.

No. 710,504. Patented Oct. 7, 1902.
L. NEWMAN.
MACHINE FOR HEMMING GARMENTS.
(Application filed Mar. 29, 1901.)
(No Model.) 8 Sheets—Sheet 7.

Witnesses
Fred D. Sweet
Walter Famanss

Inventor:
Leopold Newman
By Kay & Totten
Attorneys.

No. 710,504. Patented Oct. 7, 1902.
L. NEWMAN.
MACHINE FOR HEMMING GARMENTS.
(Application filed Mar. 29, 1901.)

(No Model.) 8 Sheets—Sheet 8.

WITNESSES:
Fred D. Sweet
Walter Tamarise

INVENTOR:
Leopold Newman
By Kay & Totten
ATTORNEYS.

UNITED STATES PATENT OFFICE.

LEOPOLD NEWMAN, OF BRADDOCK, PENNSYLVANIA.

MACHINE FOR HEMMING GARMENTS.

SPECIFICATION forming part of Letters Patent No. 710,504, dated October 7, 1902.

Application filed March 29, 1901. Serial No. 53,403. (No model.)

*To all whom it may concern:*

Be it known that I, LEOPOLD NEWMAN, a resident of Braddock, in the county of Allegheny and State of Pennsylvania, have invented a new and useful Improvement in Garment-Hemming Machines; and I do hereby declare the following to be a full, clear, and exact description thereof.

My invention relates to a machine for sealing or finishing the hems on the bottoms of trousers-legs, skirts, and other garments and articles.

In a certain class of trousers it is the common practice to secure the hem at the bottom of the legs by means of an adhesive substance instead of sewing. Prior to my inventions this has been done by hand, and the mode of procedure consisted in inserting in the hem a strip of gum-tissue, then moistening the same, and pressing by means of a hot iron. The heat of the iron melted the gum-tissue sufficiently to securely cement the turned-up portion to the body of the trousers-leg. In order to keep the gum-tissue in place, it was found necessary to baste down the hem after the gum-tissue was inserted therein, which basting was removed after the cementing had been accomplished. The operation was a slow and laborious one and required a considerable amount of care in order to properly finish the work.

My invention provides a machine for performing the above-mentioned operations whereby the same can be carried out expeditiously and cheaply and without the necessity of skilled labor, and said machine is an improvement upon a machine for a similar purpose invented by me and described and claimed in my application filed June 17, 1899, Serial No. 720,910. The machine described in the said application comprises a rotary step-by-step support for the bottom of the trousers-leg, together with mechanism for automatically inserting the gum-tissue in the fold or hem at the bottom of said leg, means for dampening and moistening the same, and a heated presser-roll for pressing the said hem or fold in order to melt the gum-tissue and cement the turned-up portion to the body of the trousers-leg. Inasmuch as trousers-bottoms are of different widths, it follows that varying amounts of gum-tissue must be placed in the hems thereof, and in the machine described in said application the tissue is fed to the fold or hem in short pieces and the number of such pieces fed thereto is controlled automatically by a stretcher which is inserted in the trousers-bottom and the position of which permits a greater or less number of such pieces of gum-tissue being fed to the hem, according to the size of the trousers-bottom. This mechanism, however, controls only the number of pieces of gum-tissue fed to the hem, and inasmuch as one piece of such tissue is fed into the hem for each inch or unit of the width of the trousers-bottom it follows that if the width of the latter includes a fraction of an inch or unit there will be left a space equal to the said fraction which will not be sealed. In order to overcome this difficulty, the said stretcher automatically controls the means for imparting a step-by-step movement to the support for the trousers-bottom, so that said support will be given a forward movement a fractional portion in excess of an inch or a unit, thereby dividing this fractional inch or unit into as many parts as there are inches or units in the circumference of the trousers-bottom, and thus providing a slight space between each piece of gum-tissue, which space, however, is entirely covered when the gum-tissue melts.

The operation and function to be performed by the machine of this application are the same in general as those above described in connection with the machine of my prior application; but the machine of the present application is an improvement upon the former machine, whereby the mechanism of the same is greatly simplified and the machine made more easy to operate and also rendered more efficient. The improvement comprises the details in construction, as will hereinafter more fully appear.

In the accompanying drawings.

The machine is provided with the table or base 1, upon which is mounted the plate 2, to which is secured or integrally formed therewith the vertical standard 3, said standard being a thin broad plate, as shown, and to the rear side of which is secured the web 4. The plate 2, standard 3, and web 4 may conveniently be cast in one piece; but they may be formed in any other suitable way. To the plate 2, to the rear of the standard 3, are secured the standards 5ª, two in number, and in these standards and on the standard 3 and table 1 all of the operative parts of the machine are mounted. The main drive-shaft 5 of the machine is mounted in the upper ends of the standards 5ª 5ª, and in the standard 3 in suitable journal-boxes placed therein is mounted the spindle 6, which serves as a support for the trousers-bottom and which is given an intermittent rotary step-by-step movement by the mechanism hereinafter described. The standard 3 above the bearing for the spindle 6 is provided with the upwardly-projecting portions 7, one on either side, between which projections slides the frame or housing 8, said frame being provided with suitable grooves, which receive the guides or projections 7. In the lower end of this frame or housing in suitable journal-bearings formed therein is mounted the hollow presser-roll 9, which is heated by means of a gas-jet (not shown) and which is provided with a suitable spur-gear, (not shown,) which meshes with a suitable spur-gear (not shown) on the spindle 6 precisely as in my former application, the said gears being located in a hollow formed in the standard 3 and frame 8 and said gears being so proportioned that the said hollow presser-roll 9 is driven at a greater circumferential speed than the spindle 6. These gears and their positions are clearly shown and described in my former application, and as they are not claimed herein it is not deemed necessary to illustrate the same. Mounted on the frame or housing 8 is the water tank or reservoir 12, which supplies the water for the moistening device, hereinafter described, and which, together with the frame or housing 8, serves as a weight for the presser-roll 9, although said roll may be held in contact with the spindle 6 by means of springs, if desired. The said tank or reservoir 12 is provided at its upper end with the ears 13, in which is mounted the shaft 14, provided with the eccentrics 15, which bear on the upper ends of the guides 7. Also secured to the shaft 14 is the arm 16, by means of which said shaft may be rotated and through the eccentrics raise the tank 12, housing 8, and presser-roll 9 whenever it is desired to take off a finished trousers-leg and put another in place. The crank or arm 16 is connected, by means of a link or rod 17, to the rear end of a lever 18, which is pivoted at 19 to the legs of the table 1 and which is provided at its forward end with a suitable foot-rest 20, by means of which said lever is operated.

The spindle 6 is provided on its rear end with a suitable hub 21, in which is formed a circumferential groove for receiving the spring wire or band 22, by means of which intermittent rotary movement may be imparted to said spindle, as will now be described. The rear end of the spindle 6 is provided with the central projecting stud or bolt 23, upon which is mounted the oscillating lever 24, the outer end of which is provided with the plate 25, which is at right angles to the axis of said lever, to which plate is rigidly secured, as at 26, one end of the spring wire or band 22. The opposite end of this band or wire lies just underneath a projecting portion 27 of a dog 28, which is pivoted, as at 29, to said plate 25 and which on its outer end is provided with a roller 30. The lever 24 is provided between its pivotal point and its outer end with the projecting ears of flanges 31, in which is rotatably mounted the block or stud 32, said block or stud being provided with an opening for receiving the inner end of a lever 33, which lever is fulcrumed at 34 and provided at its outer end with the segment 35, which is provided with a segmental slot 36, which takes over the main drive-shaft 5. This segment is provided with the rollers 37 and 38, which lie in the paths, respectively, of the cams 39 and 40, secured to the main drive-shaft, and said cams coming in contact in alternation with the rollers 37 38 serve to alternately lift and depress the said segment 35, and thereby oscillate the lever 33 about its fulcrum-point 34, thereby giving a similar oscillating movement to the lever 24.

The fulcrum-point 34 of the lever 33 is mounted on the box 41, which is suitably secured to or integrally formed on the upper end of the arm 42. The fulcrum of said lever 33 is formed by two pointed screws 43, which take into depressions in the sides of a sleeve 44, in which sleeve slides the said lever 33, so that this sleeve may be moved longitudinally of the said lever, but will still be fulcrumed or oscillated on the screws 43. Sliding through the box 41 is the plunger 45, the same being provided with a slot through which passes the fulcrum-screw 43 and being provided on its outer end with an antifriction-roller 46, which is adapted to bear against the cam 47 on the main shaft 5. At its inner end said plunger is provided with the vertical plate 48, which bears against the antifriction-roller 30 on the dog 28. The operation of this part of the mechanism is as follows: By the rotation of the shaft 5 the cams 39 and 40 alternately strike the antifriction-rollers 37 and 38, thereby imparting an oscillatory movement to the lever 33 and a similar movement to the lever 24, and as the spring wire or band 22 is secured to the latter it is given an oscillatory rotary movement in the groove formed in the hub 21 of the spindle 6. This band or wire normally engages the groove of said hub so loosely that the friction is not sufficient to rotate said spindle; but at the proper time in the movement of the lever 24—namely, when it is just beginning its downstroke—the cam 47 moves the plunger 45 inward, thereby causing the plate 48 to bear against the antifriction-roller 30 and rock the dog 28 to cause the projection 27 to bear down on the free end of the wire or band 22, thereby tightening said band in the groove on the spindle 6 and causing it to grip the latter and carry the same around with it to the limit of the movement of the oscillatory lever 24. At the end of this movement the cam 47 has passed the antifriction-roller 46 on the plunger 45, thereby permitting the plate 48 to move backward and permitting the dog 28 to release the spring band or wire, and when the lever 24 moves upward the band 22 slides freely in the groove in the spindle 6 and does not impart a backward rotary movement to the same. By the means just described, therefore, an intermittent step-by-step rotary movement is given to the spindle 6, which intermittent rotary movement serves to feed the trousers-bottom around step by step and press the same between the presser-roll 9 and said spindle. This mechanism is so proportioned that the spindle 6 is given a forward rotary movement of one inch or unit at each double oscillation of the lever 24, and whenever the trousers-bottom measures a multiple of inches or units in circumference this feeding action is sufficient. If, however, said trousers-bottom includes a fractional inch or unit—as, for instance, if it is fifteen and one-half inches in circumference—then the said spindle 6 must be given a slightly-greater rotation at each step than the inch or unit. In order to vary the step-by-step movement to compensate for this, the fulcrum 34 of the lever 33 is made movable. As before mentioned, the said lever is mounted in the sleeve 44, so that the fulcrum of said lever may be moved, and this movement of the fulcrum is accomplished by moving the arm 42, which arm is slidably mounted upon the rod 50 and has its lower end secured between collars 51 on the shaft or spindle 52, which shaft or spindle is slidably mounted in an opening in the standard 3 and in the support or bearing 53. To the forward end of the spindle or shaft 52 is secured an arm or crank 54, which is provided with a stud 55, which bears against the pattern-plate 56, which is suitably secured to the front face of the standard 3. This pattern-plate is provided with an irregular or sinuous face, against which the stud 55 bears, and serves to hold the shaft 52 in various positions longitudinally, depending upon the particular portion of the pattern-plate against which the stud 55 projects, and thereby through the arm 42 varies the position of the fulcrum 34 of the lever 33, and as this fulcrum is varied the throw of the inner end of said lever is accordingly varied to impart a correspondingly greater or less rotary movement to the spindle 6, as will be readily understood. The spindle or shaft 52 is provided with the bevel-disk 57, against which is adapted to bear the antifrictional roller 58 on the upper end of the rod 59, which passes through the plate 2 and is secured at its lower end to the lever 18. Between the disk 57 and the standard 3 a spiral spring 60 is placed, which tends normally to move the shaft 52 to the rear to keep the projection 55 in contact with the pattern-plate 56. The particular portion of the pattern-plate against which this projection bears is regulated automatically by the size of the trousers-leg, as will now be described.

Suitably secured at its one end to the standard 3 and at its opposite end to the plate 2 is an inclined guide-bar 61, upon which is adapted to slide the plate 62, the said guide-bar 61 being beveled and the plate 62 having suitable lips which take over the beveled portion in order to keep the same in contact therewith. On the plate 62 is suitably mounted a stretcher-roller 63, which is adapted to take into the trousers-bottom and to stretch the same over the spindle 6, the plate 62 moving up and down the guide-bar 61, as necessary. The size of the trousers-bottom will determine the position of the roller 63 and of this guide-plate 62. The said guide-plate is provided with the stud 64, which takes into the slotted end of a lever 65, suitably pivoted, as at 65$^a$, to the base 2. The lever 65 has connected thereto a spring 66, suitably secured at its lower end to the lever 18, whereby said lever 65 is held normally down in order to exert a pull on the roller 63 in order to stretch the trousers-bottom. The lever 65 is provided with the arm 67, on the rear side of which is a stud which takes in a slot in the front face of the arm or crank 54 of the shaft 52 and serves to rotate the latter according to the position of the stretching-rollers 63. Consequently the size of the trousers-bottom through the lever 65 having this connection with the arm or crank 54 determines the position of the projection 55 on the pattern-plate 56, and thereby determines the position of the fulcrum-point 34 of lever 33, and consequently the extent of the oscillatory step-by-step movement given to the spindle 6.

It is obvious that the shaft 52 might be the pivotal point 65$^a$ of the lever 65, with the arm 67 on said lever moving over the pattern-plate 56, and in this manner the longitudinal position of the spindle 52 would be varied. I mention this for the reason that in one of the machines built by me this modified construction has been followed. The arm 67 of the lever 65 is connected, by means of a link 70, to the end of an arm or crank 71 on the forward end of a short stub-shaft 69, which is suitably mounted in an opening in the standard 3, to the rear end of which shaft is secured the serrated cam 72 for a purpose which will hereinafter appear. Projecting downwardly from the front of the table 1 is the bracket 73, on which is mounted the bell-crank lever 74, one arm, 75, of which is connected by the link 76 to the rear end of the lever 18. The other arm, 77, of said bell-crank lever is provided with two pivoted sections 78 and 79, the construction being such that said sections will yield only in one direction, but when pressure is brought against them in the opposite direction they form, in effect, a rigid extension of the arm 77. These sections 78 79 are adapted to bear against the antifriction-roller 80 on the lever 65 and raise the same, after which they pass beyond said roller and in their backward movement they yield or turn about their hinges, so that said roller 80 will not interfere with the return movement of the lever 77. To the side of the lever 18 is pivoted the latch 81, which at its rear end is provided with a finger 82, which will fall underneath the shoulder 83 on the bracket 84, to which said lever is pivoted, whereby when said lever 18 has its front end depressed it will be held by said latch in this position. When the said lever 18 is depressed at its forward end through the rod 17, the reservoir 12, housing 8, and presser-roller 9 are elevated and held in their elevated position until the latch or trigger is released. The same movement through the bell-crank lever 74 raises the lever 65, plate 62, and stretching-roller 63 and moves the arm 54 over the pattern-plate 56, and thereby moves the spindle 52 longitudinally and also oscillates the serrated cam 72 to what may be designated the "zero" positions of said spindle 52 and serrated cam 72. The plate or carriage 62 is provided at its upper end with the hooked projection 85, which when said plate is moved to its full upward movement comes in contact with the lower hooked end 86 of a spring-latch 87, which is mounted in lugs 88 on the front face of the standard 3 and which is provided with the handle 89 and is surrounded by a suitable spiral spring 90. This spring-latch engages the hook 85 of the plate 61 and holds the latter, together with the stretching-roller, in its elevated position until a trousers-bottom is put over the said stretching-roller and spindle 6, when by operating the handle 89 of the spring-latch just described the said stretching-roller and its plate will move down on the guide-bar 61, thereby stretching the trousers-bottom over the spindle 6 and determining, according to the width of said trousers-bottom, through the lever 65, arm 67, and arm 54 the longitudinal position of the spindle 52 and through said arm 67, link 70, and crank 71 the position of the serrated cam 72.

The gum-tissue-feeding mechanism is mounted on a plate 91, said plate being provided with a hub 92, which slides on the stud 93, projecting out from the standard 3. The stud 93 is provided with a suitable annular groove 94, which is adapted to be engaged by the lower end of the latch 95, which is suitably mounted in the plate 91 and is pressed downward by a spring 96 to normally engage the notch 94 in the stud, whereby said gum-tissue-feeding mechanism and its support are held normally in operative position, in which position it is retained until the required number of pieces or units of gum-tissue have been fed to the fold of the trousers-bottom, and when the required number have been so fed the said feeding mechanism and its supporting-plate are automatically moved out of operative position by mechanism which will now be described. The said gum-tissue-feeding mechanism, as before stated, is held in its operative position by the latch 95 and is borne against by the plate-spring 97, which when said mechanism is in its operative position is under tension, so that as soon as the latch 95 is released from the notch 94 said spring will move the said mechanism outward and away from its operative position. The latch 95 is provided with a stud 98, on the upper surface of which bears the spring 94 and which is adapted to be engaged by the curved arm 99 of a bell-crank lever suitably pivoted, as at 100, the other arm 101 of which bell-crank lever is adapted to be engaged by the pusher 102 in order to release the said latch 95 from the groove 94, and thereby permit the moving of the gum-tissue-feeding mechanism to its inoperative position. The pusher 102 is mounted to slide in suitable bearings in the web 4 of the standard 3, and said pusher is provided with the lower bar 103, the rear end 104 of which is adapted to contact with one of the serrations of the cam 72, before described, the position of which cam depends upon the width of the trousers-bottom. A spring 105 tends to keep said pusher normally in its retracted position, with the rod 103 against the cam 72. Above the bar 103 is the bar 106, which is provided on its surface with a series of teeth or serrations 107, which are adapted to be engaged by a pawl 108 in order to feed the said pusher forward step by step. The pawl 108 is provided at its upper end with a projection 109, which passes through the bearing 101, a spiral spring 111 having one end secured to said bearing and the opposite end to the pawl. Thereby said pawl is held normally elevated, with its point out of contact with the serrated bar 106. The said pawl is provided with an antifriction-roller 112, against which bears the lower end of a lever 113, which is pivoted on the stud or screw 23 of the spindle 6 and which is provided at its upper end with an antifriction-roller 114, which lies in the path of a cam 115 on the rear face of a cam-disk 116, secured to the main shaft 5. The serrated bar 106 passes through a sleeve on the web 4, which sleeve has formed thereon the inclined face 117, upon which the pawl 108 normally rests, and when said pawl is depressed by the rocking of the lever 113 the said pawl rides down said inclined face and into the serrations of the bar 106 and moves the same forward one step. To prevent backward movement of the said pusher, I provide a latch 118, pivoted as at 119, said latch being pressed by means of a spring 120 to engage the rack-bar, as will be readily understood, and having a forwardly-projecting arm 119$^a$, which lies in the path of the cam-surface 120$^a$ on the hub 92.

The position of the cam 72, as above stated, is regulated by the width of the trousers-bottom, and the pusher 102 is held against this cam 72 by the spring 105, and the position of said cam determines the extent to which said pusher will project forward beyond the inclined face 117, on which the pawl 108 rests—that is, with a small trousers-bottom the pusher 102 will be held in such position at the beginning of the operation that a comparatively small number of serrations 107 are covered by the inclined wall 117, and said pusher projects correspondingly closer to the bell-crank lever 101 than in case of a large trousers-bottom. As a consequence with a small trousers-bottom a comparatively few step-by-step forward feedings of the pusher 102 will bring said pusher against the bell-crank lever 101 and through the same elevate the latch 95, thereby permitting the spring 97 to throw the gum-tissue-feeding mechanism out of its operative position. On the other hand, with a large trousers-bottom the position of the cam 72 is such that the pusher 102 will be held comparatively far back at the beginning of the operation, so that a correspondingly larger number of step-by-step forward movements must be given to said pusher before the latch 95 will be released. Through the cam 72, therefore, and the step-by-step movement given to said pusher 102 I provide automatic mechanism controlled by the size of the trousers-bottom for automatically stopping the feeding of the gum-tissue to the fold of the trousers-bottom at the desired time.

Figure 1:
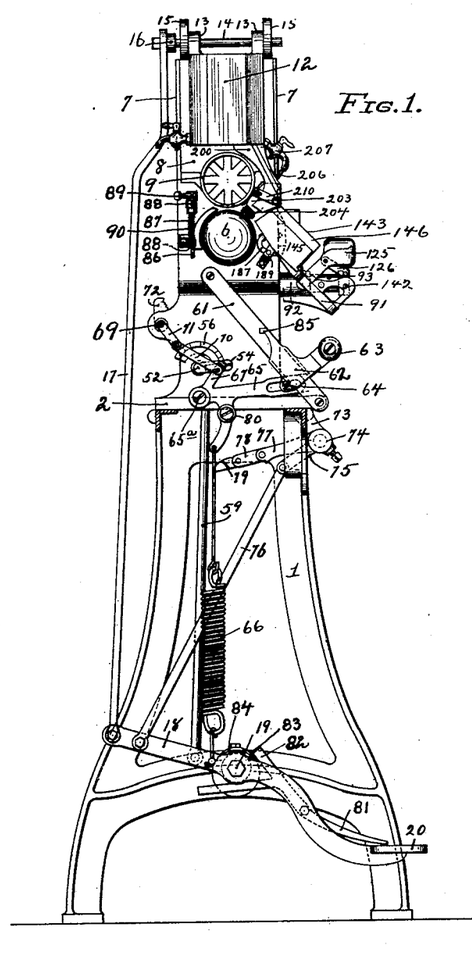
Figure 1 is a front end elevation of my improved machine.
Figure 2:
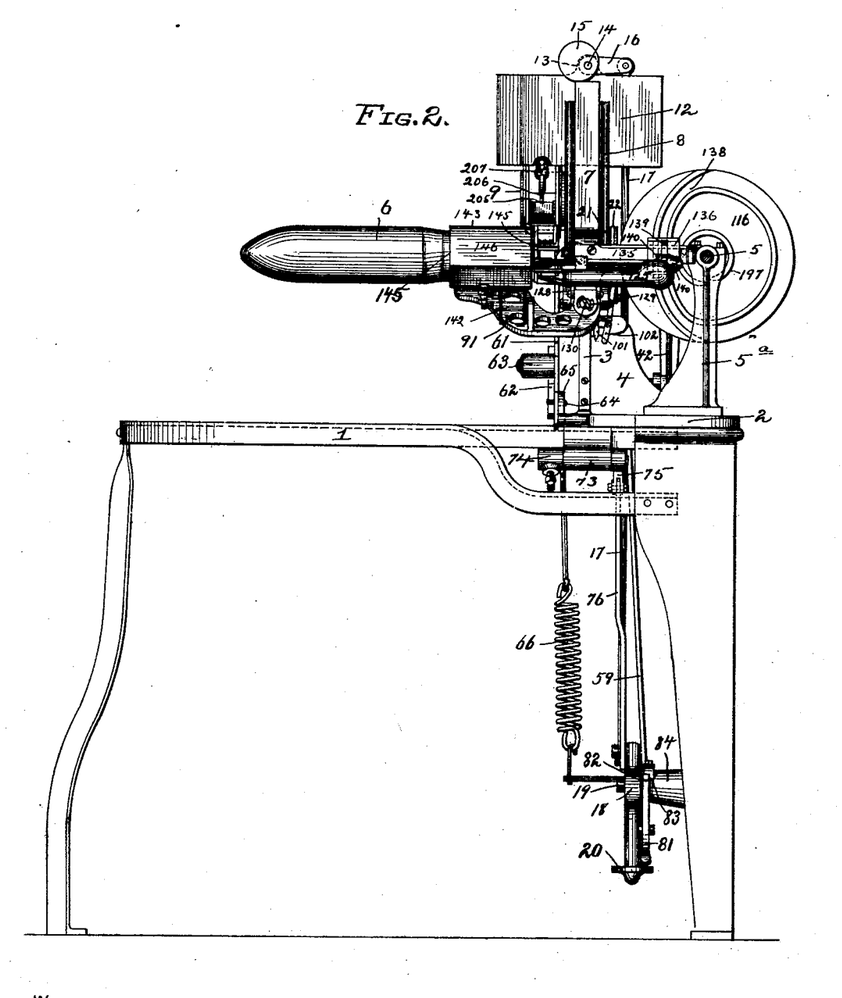
Fig. 2 is a front side elevation of the same.
Figure 3:
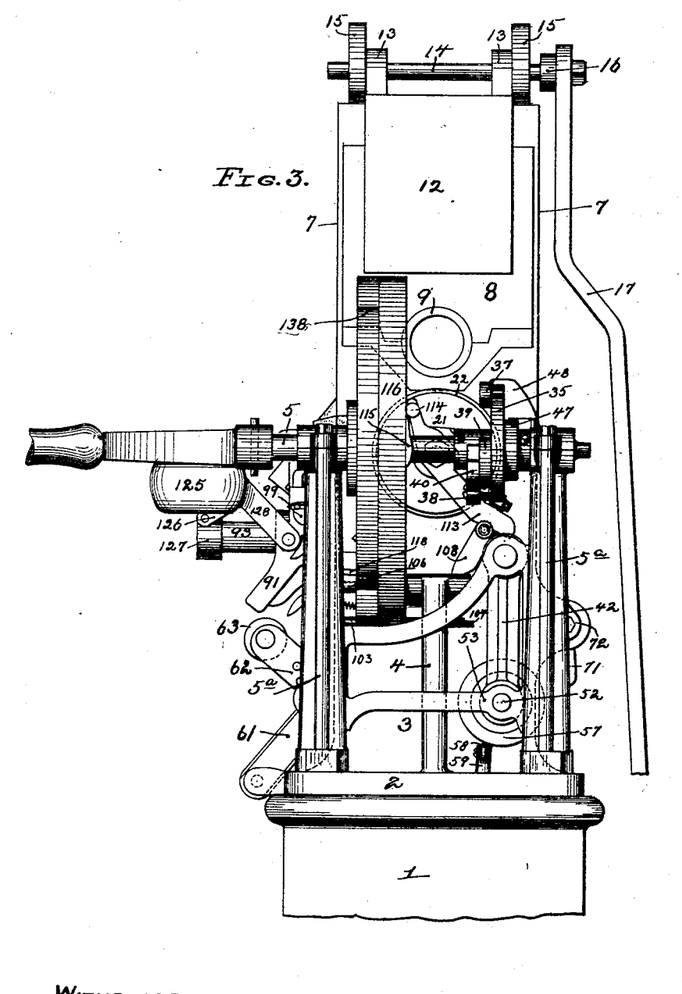
Fig. 3 is a rear end elevation of the upper portion thereof.
Figures 4, 7:
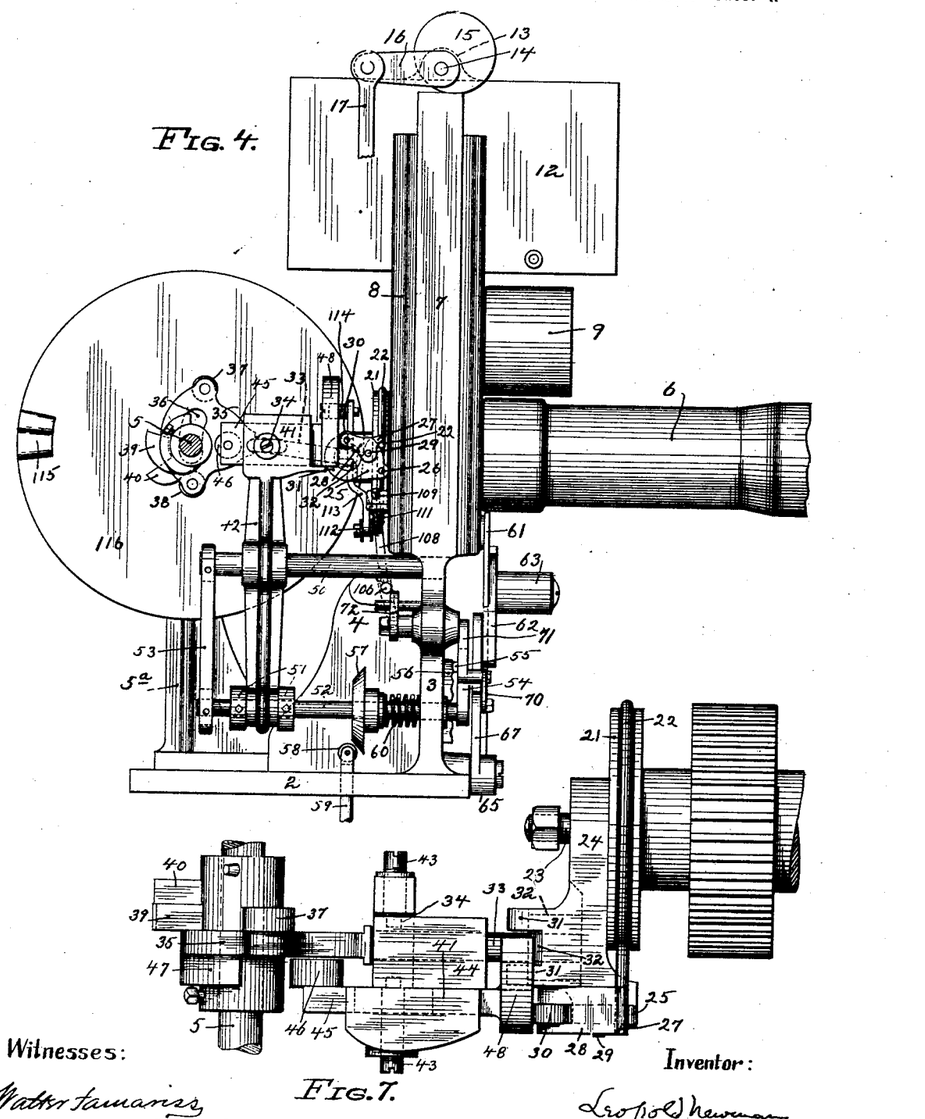
Fig. 4 is a rear side elevation, partly in section, of the upper portion thereof.
Fig. 7 is an enlarged top plan view of the movable fulcrum of the lever for operating the supporting-spindle.
Figures 5, 6:
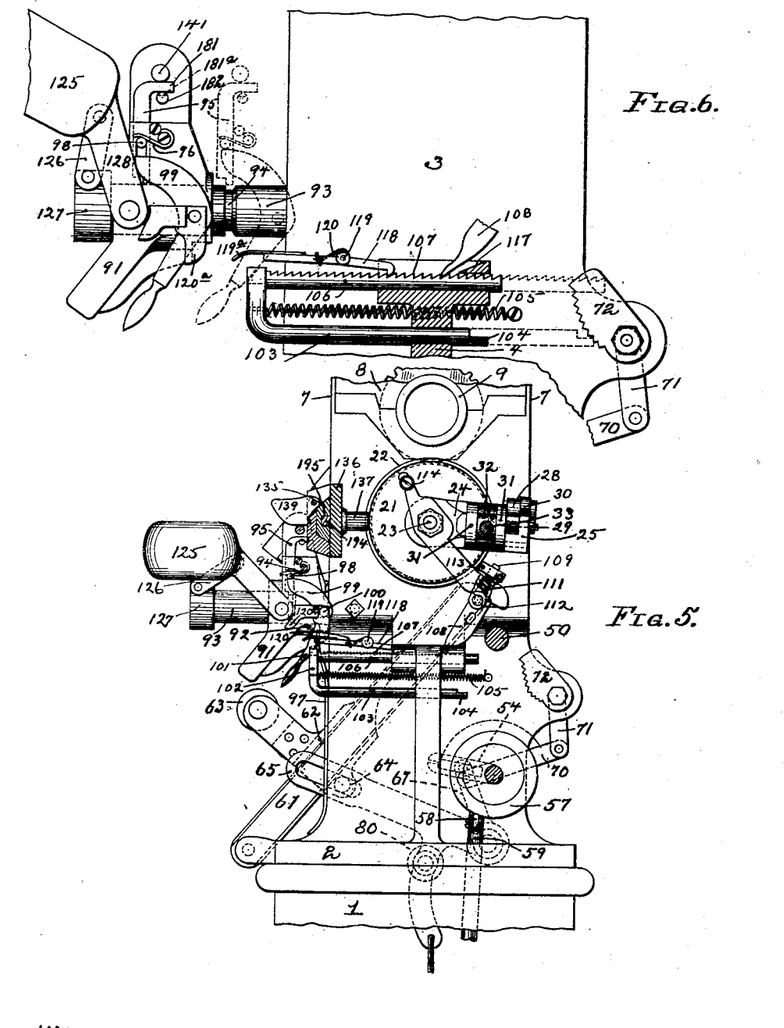
Fig. 5 is a rear end view, partly in section, of the upper portion of the machine.
Fig. 6 is an enlarged detail showing another position of certain parts shown in Fig. 5.
Figure 8:
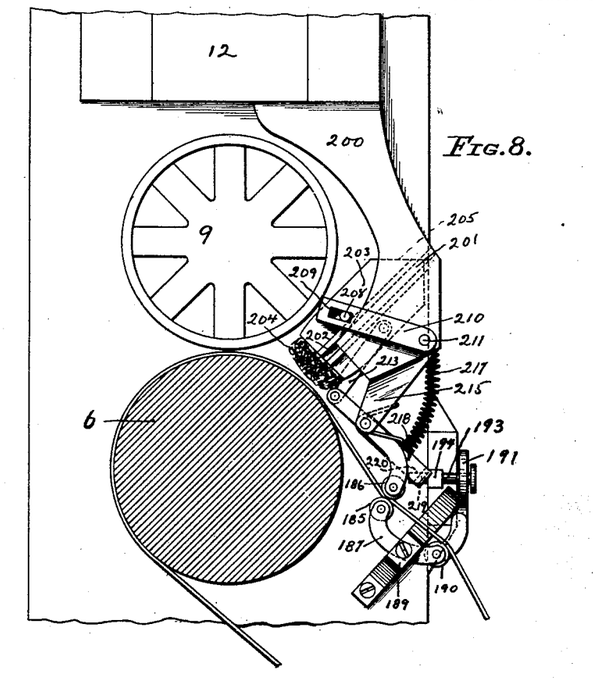
Fig. 8 is a front view, enlarged, of the moistening and pressing devices.
Figure 9:
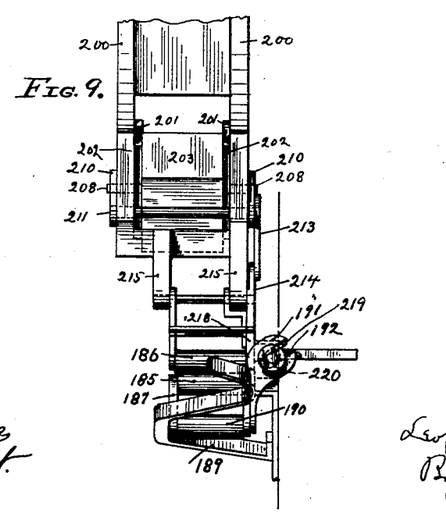
Fig. 9 is a side view of the same.
Figure 10:
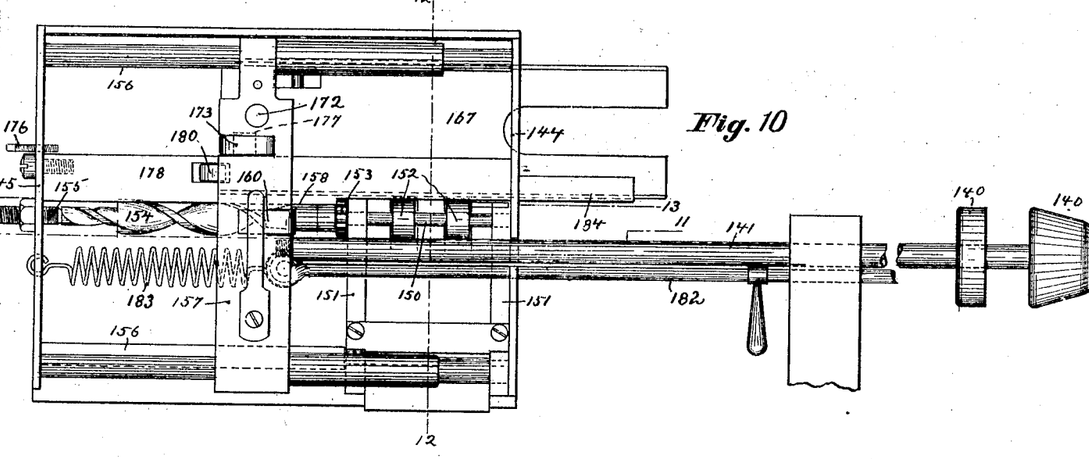
Fig. 10 is a plan view of the frame carrying the gum-tissue-feeding mechanism, the cover being removed.

The hub 92 of the supporting-plate 91 has pivotally secured thereto the weighted handle 125, which handle is connected by the links 126 to a collar 127 on the outer end of the stud 93. The projecting portion 128 of said handle, together with the links 126, provides, substantially, toggle members, by means of which the said plate 91 can be moved inward to its operative position. The hub 92 is provided on either side of the hole which receives the stud 93 with the segmental slots 129, which are engaged by the ends of a pin 130, extending through the stud 93, and said pin bearing against the shoulders formed by the slots 129 prevent rotation of the said hub on said stud except in one direction. Normally the left-hand end of the plate 91 (shown in Fig. 2) overbalances the right-hand end, so that the pin 130 normally holds the plate 91 in its horizontal position. When, however, the said plate is moved out of its operative position, it may be desirable to entirely move this mechanism out of the way, in which case the operator will grasp the handle 125 and rotate the plate 91 about the stud 93, raising the forward end of said plate and depressing the rear end of the handle, so that the mechanism will stand in substantially a vertical position, in which event the weighted handle will overbalance the other end and retain this mechanism in this position until it is again moved to the horizontal position.

Suitably secured at its ends to the standards 3 and 5$^a$ is the guide-bar 135, on which guide-bar slides the cross-head 136, which cross-head is provided on its rear face with a pin 137, which takes into the cam-groove 138 on the cam-disk 116. The cross-head 136 has pivoted thereto the latch 139, which latch takes between the collars 140 on the end of the rod 141, which operates the gum-tissue-feeding mechanism, as will now be described. The pivoted latch 139 permits the ready disengagement of the said rod 141 from the cross-head 136 whenever the gum-tissue feeding mechanism is moved outward from its operative position, as before described.

Figure 11:
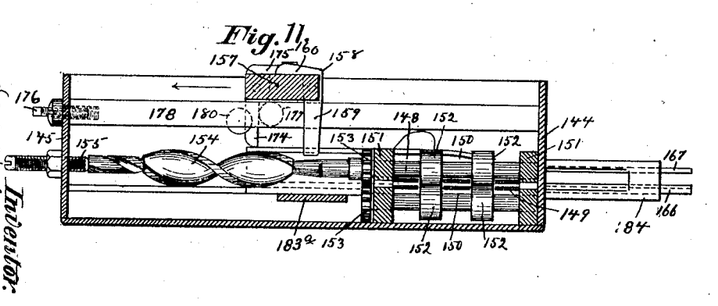
Fig. 11 is a section of the same on the line 11 11, Fig. 10.
Figure 12:
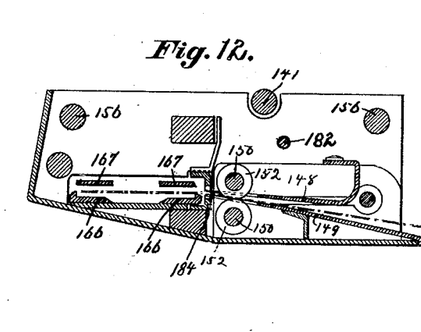
Fig. 12 is a section on the line 12 12, Fig. 10.

On the plate 91 are provided suitable bearings for a reel 142, upon which the strip of gum-tissue is wound. Also secured to said plate 91 is a box 143, provided with the ends 144 and 145 and cover 146, in which box the gum-tissue feeding and cutting mechanism is located. The gum-tissue is led through an opening in the wall of said box and between guide-plates 148 and 149, as shown in Fig. 12, and then between the guide-rollers 150, which guide-rollers are suitably mounted in bearings 151 and provided with the rubber or similar friction-disks 152, which form the working faces of said rolls. One end of each of these rolls has secured thereto a spur-gear 153, which spur-gears intermesh to cause said rolls to rotate together. The upper roll 150 has its shaft extended and provided with a double spiral groove 154 and has its outer end journaled on the pointed end of a screw 155, extending through the end wall 145 of the box. In the upper portion of the said box, on opposite sides thereof, are the rods 156, which serve as guides for the cross-head 157, said cross-head being secured to the end of the rod 141, above described, by means of which the said cross-head is reciprocated back and forth. Pivotally mounted on this cross-head 157 is the dog 158, said dog having the vertical arm 159 and the horizontal arm 160, which is adapted to lie on the upper face of the cross-head 157. When the said cross-head moves in the direction of the arrow, Fig. 11, the said dog will have its horizontal arm 160 engage the upper face of the cross-head, and consequently will be kept from swinging about its pivotal point. The depending vertical arm 159 then engages one of the spiral grooves 154 of the roller 150, and as said cross-head moves toward the left the roller will be given a rotary movement, as will be readily understood. When the cross-head, however, moves in the opposite direction, the dog 158 will simply swing about its pivotal point and the depending arm will ride idly over the spirals 154 and not give a rotary backward movement to the feeding-rollers 150, as will be readily understood.

Figure 13:
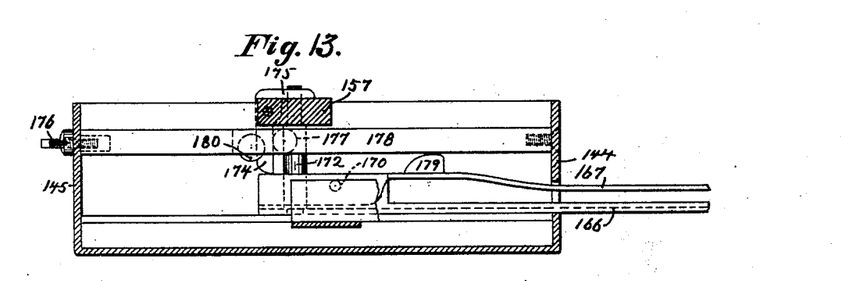
Figs. 13 and 14 are sections on the line 13 13, Fig. 10, showing different positions of the tongs and accessory parts.
Figure 14:
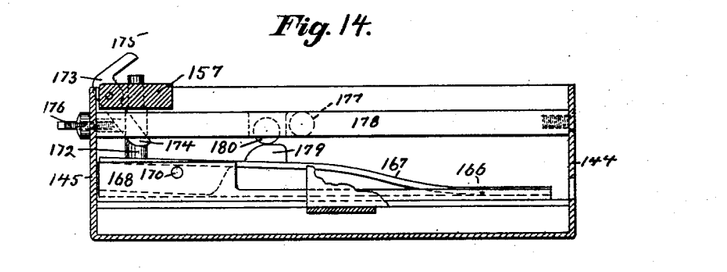
Figure 15:
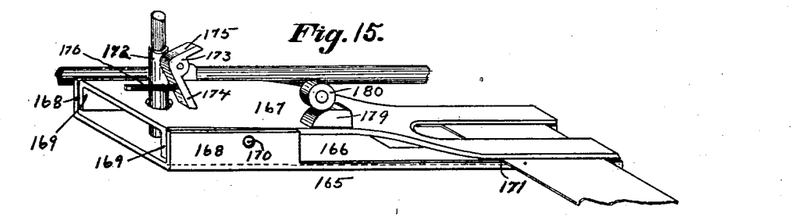
Fig. 15 is a perspective view of the tongs and certain parts acting in conjunction therewith.
Figure 16:
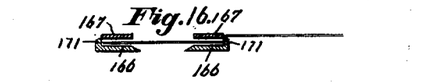
Fig. 16 is a cross-section of the tongs, showing the gum-tissue being cut thereby.

The feeding-rollers 150 and their actuating mechanism are located in the lower portion of the box 143. In the upper portion of said box and suitably secured to the cross-head 157 are the tissue cutting and feeding tongs 165, the said tongs comprising the lower member 166 and the upper member 167. The lower member has its edges turned up, as at 168, and the upper member has its edges turned down to form the ears 169, which are pivoted, as at 170, to the ears 168. The lower member also has its edges at the forward end turned up, as at 171, which edges are sharpened to form, in effect, cutting-blades in conjunction with the upper member 167, as clearly shown in Fig. 16. The lower member 166 is connected by means of the post 172 to the cross-head 157. Mounted on said cross-head is the pivoted dog 173, which has the vertical depending arm 174 and the upper horizontal arm 175, which is adapted to lie on the upper face of said cross-head. Through the rear wall 145 of the box projects a set-screw 176 in position to contact with the vertical arm 174 of the dog 173 when the said tongs are in their retracted position, and when the said tongs are in their extended position the said vertical arm is adapted to contact with a stud or abutment 177, suitably secured on a bar 178, extending through said box. The arm 174 of the dog 173 contacts with the upper member of the tongs back of the pivotal point thereof, so that when said dog is brought to its vertical position, as shown in Fig. 13, by coming in contact with the abutment 177 the rear end of the upper member will be depressed, thereby opening the tongs. The tongs are then moved backward into the box 143, and when they reach the rear limit of their movement the stop 176 comes in contact with the said member 174 and moves the same to the position shown in Fig. 14, thereby permitting said tongs to be closed, which is accomplished by means of the cam projection 179 on the upper member of said tongs and located in front of the pivotal point thereof moving under the fixed abutment or roller 180, secured in the bar 178. It will thus be seen that when the tongs are in their retracted position—that is, in the box 143—they will be closed, thereby cutting off a section of the gum-tissue and grasping the same, and as the tongs are projected out of the box they retain their grasp on this gum-tissue and carry the same into the fold of the trousers-bottom, and when they have reached the limit of their projected position the dog 173 comes in contact with the abutment 177, which moves said dog to the vertical position to bear against the rear end of the upper member of the tongs, thereby opening the latter and permitting the gum-tissue to be retained in the fold of the trousers-bottom, said tongs then moving to their retracted position in the box 143 and remaining open until they reach near the limit of their retracted position, when they are again closed, as above explained. The operation, therefore, of the rod 141 by means of the cross-head 136 operates through the mechanism just described the feeding of the gum-tissues to the shears and tongs, the cutting of the same off, and the carrying of the severed piece into the fold of the trousers-bottom and depositing of the same therein.

The pawl 95 is provided on its upper end with the finger 181, which engages a notch 181$^a$ in the rod 182, which rod projects into the box 143 and is normally retracted by the spring 183. This spring and rod 182 are secured to a post on the cross-plate 183$^a$, which carries the guide or shield 184, projecting normally into the hem of the trousers-bottom and holds the same open to permit the placing of the gum-tissue into said hem by the tongs. When the required amount of gum-tissue has been fed to the hem, the finger 181 is disengaged from the notch 181$^a$, thereby permitting the spring 183 to withdraw the guide 184 from the hem.

To retain the gum-tissue in the fold of the trousers-bottom after it is deposited therein by the tongs, I provide suitable biting-rollers 185 and 186. The roller 185 is mounted in the rocking frame 187, pivoted in the bracket 189, secured to the standard 3. Said frame is also provided with a roller 190, which also bears against the inside of the trousers-leg. This rocking frame is provided with the projecting arm 191, having formed in its end the inclined slot 192, into which projects one end of a cross-head 193, secured to the forward end of a reciprocating rod 194. This rod 194 extends to the rear and lies in a groove 195, formed in the guide 135, and its rear end is adapted to engage and be actuated by the cam 197 on the main drive-shaft 5. Projecting down from the reservoir 12 are two brackets 200, which are provided with suitable guides 201, which take into grooves 202 on the sides of the cup 203. The inner end of this cup is provided with a sponge 204, and the outer end has an opening 205 therein, into which projects the end of the tube 206, which is connected through a suitable valve 207 to the reservoir 12, whereby said sponge is kept moist. The cup 203 is provided with the pins 208, which take into slots 209 in the inner ends of levers 210, the rear ends of which are pivoted at 211 to the brackets 200. To the middle portion of one of these levers is pivoted a link 213, the lower end of which is pivoted to the lever 214, which lever is pivoted in the lugs 215, secured to the brackets 200, and which lever at its opposite end carries the roller 186, before mentioned, which bears on the outside of the trousers-bottom. A spring 217 bears at one end upon the arm 218 of the lever 214 and at its opposite end against a stud on the bracket 200, the function of said spring being to hold the roller 186 normally in contact with the roller 185 and at the same time keeping the sponge elevated or away from the trousers-bottom. Projecting out from the arm 218 is an inclined wedge-face 219, which is adapted to be engaged by a similar-wedge face 220 on the cross-head 193, before mentioned, the operation of this part of the mechanism being as follows: As the rod 194 is moved forward by the cam 197 one end of the cross-head 193 engages the inclined slot 192 in the arm 191, thereby causing a rocking of the frame 187 about its pivotal point and causing a depression of the roller 185. At the same time the wedge-face 220 on said cross-head bears under the wedge-face 219 of the arm 218 and tends to elevate the same, thereby rocking the lever 214 about its pivotal point and elevating the roller 186, so that the said rollers 186 and 185 release their bite on the trousers-bottom, and this releasing is timed to take place at the time when said trousers-bottom is given one of the intermittent forward-feeding steps. At the same time the inner end of the lever 214 is depressed and draws down on the link 213 and through the levers 210 moves the sponge-cup downward and presses the sponge against the trousers-bottom to suitably moisten the same. As soon as the cross-head 193 recedes the spring 217 will again elevate the sponge-cup and depress the roller 186, while the movement of said cross-head in the inclined slot 192 will again rock the frame 187 to elevate the roller 185 and cause it, together with the roller 186, to bite on the hem of the trousers-bottom.

The operation of the machine as a whole is as follows: The operator places his foot upon the step 20 of the lever 18 and through the same, by means of the rod 17 and connecting mechanism, elevates the water tank or reservoir 12, frame or housing 8, and the presser-roll 9, and through the link 76 and bell-crank lever 74 moves the plate 62 and stretching-roller 63 upward on the guide 61 until it is retained by the latch 86, and through the lever 67 and its connecting mechanism moving the serrated cam 72 and the spindle 52 to what may be termed their "zero" positions, the rod 59 bearing against the disk 57 and moving the shaft 52 to disengage the stud 55 from the pattern-plate 56, so that the crank-arm 54 on said shaft can be easily turned over the pattern-plate 56. The latch 81 locks the lever 18 in this position to hold the presser-roll elevated and the shaft 52 out of engagement with the pattern-plate 56. The gum-tissue-feeding mechanism and its support 91 are in their outer or inoperative position and preferably swung about the stud 93 to stand in a vertical position, whereby they are entirely out of the way. A trousers-bottom suitably folded is then placed over the spindle 6 and stretching-roll 63 and between the gripping-rollers 185 and 186. The main drive-shaft may be operating continuously, as when it is driven by power, and will not interfere with this placing of the material in the machine. As soon as the trousers-bottom is suitably inserted the operator releases the trip 81, thereby permitting the presser-roller 9 to descend, and he also releases the latch 85, thereby permitting the stretcher-roller 63 to ride down the inclined guide 61 to the full extent permitted by the width of said trousers-bottom, and as said stretcher-roller moves down through the bell-crank lever 65, link 70, and crank 71 it sets the cam 72 to the required position and through the arm 67 and arm or crank 54 rotating the shaft 52 to the desired position, when the spring 60 will move said shaft longitudinally until limited by the projection 55 coming against the pattern-plate 56, which movement of the shaft 52 moves the fulcrum-point of the lever 33 to the desired position. The pusher 102 is held by the spring 105 against the cam 72. The gum-tissue-feeding mechanism is then swung down to its horizontal position and moved inward toward the machine, in which position it is locked by the latch 95 dropping in the groove 94, and the rod 141 engages the cross-head 136, which causes the reciprocation of said rod and the cross-head 157, thereby causing a step-by-step feeding of the gum-tissue, cutting off the same, and carrying and depositing of the cut-off portion in the fold of the trousers-bottom in the manner described. Through the cams on the main cam-shaft the lever 33 is oscillated, thereby giving a step-by-step movement to the rotary spindle 6, which step-by-step movement is of a length corresponding to the position to which the fulcrum 34 of the lever 33 has been moved. The pawl 108 through the cam and lever mechanism described causes a step-by-step forward movement of the pusher 102, and the reciprocating rod 194 causes an alternate rocking of the frame 187 and of the lever 214, thereby causing an alternate biting or grasping of the hem of the trousers between the rollers 185 and 186 and then releasing the same and also intermittently pressing the sponge against said trousers-bottom. This operation continues until the pusher 102 has been given the required number of forward steps, depending upon the position of the cam 72, when the said pusher engages the lever 101 and raises the pawl 95, which raising of the pawl first causes the finger 181 thereon to disengage the notch 181$^a$ in the bar 182, thereby permitting the spring 183 to retract the guide 184 into the box 143 and freeing the same from the hem of the trousers-bottom. A slight further movement of the latch 95 causes it to become disengaged from the groove 94, thereby permitting the plate-spring 97 to throw the hub 92 and the plate and gum-tissue-feeding mechanism carried thereby outward into inoperative position, and this disengages the rod 141 from the cross-head 136, the cross-head, however, being in such position that the tongs are in their retracted position. The operator then swings the gum-tissue-feeding mechanism to a vertical position, operates the lever 18, removes the finished trousers, and puts another in its place, and then proceeds as before.

While I have shown and described my machine as applied to the sealing of the hems of trousers-bottoms, still it may readily be applied to the sealing of hems on various other garments or articles, such as skirt-bottoms and the like. The stretcher-roll 63 in that case must be placed a suitable distance from the spindle 6 to accommodate the skirt or other article. The construction and mode of operation of the machine would, however, be the same. Such adaptation of the machine I intend to include in the claims as expressed.

What I claim as my invention, and desire to secure by Letters Patent, is—

1. In a machine for finishing or sealing hems of garments, the combination with a support for the garment, a presser-roll, a stretcher-roll, a lever, and connections between said lever and presser-roll and stretcher-roll for moving the former away from the garment-support and moving the latter toward the same.

2. In a machine for finishing or sealing hems of garments, the combination with a support for the garment, of a presser-roll, a stretcher-roll, a lever, connections between said lever and presser and stretcher-rolls for moving the presser-roll away from said support and moving the stretcher-roll toward said support, and a latch for locking said lever to hold the presser-roll away from the support.

3. In a machine for finishing or sealing hems of garments, the combination with a support for the garment, of a presser-roll, a stretcher-roll, a lever, connections between said lever and the presser-roll for moving the same away from the support, connections between said lever and the stretcher-roll for raising the latter, and a spring-latch for retaining the latter in its raised position.

4. In a machine for finishing or sealing hems of garments, the combination with a support for the garment, of a stretcher-roll, means for raising the latter, and a spring-latch for engaging the same and holding it in its elevated position.

5. In a machine for finishing or sealing hems of garments, the combination with a support for the garment, of a presser-roll, a stretcher-roll, a lever, connections between said lever and presser-roll for raising the latter, a latch on said lever for holding the presser-roll in its elevated position, means controlled by said lever for elevating the stretcher-roll, and a spring-latch for engaging the latter to hold the same in its elevated position.

6. In a machine for finishing or sealing hems of garments, the combination with the support for the garment, of an oscillatory lever and connections for imparting an intermittent step-by-step movement to the support, a stretcher-roll, and connections between the same and the fulcrum of the lever whereby the amount of intermittent movement to be given to the support is varied by the position of the stretcher-roll.

7. In a machine for finishing or sealing hems of garments, the combination with a support for the garment, of an oscillating lever and connections for imparting an intermittent step-by-step movement to the support, a movable fulcrum for said lever, a pattern-plate, means connected to the movable fulcrum and bearing against the pattern-plate for varying the position of said fulcrum, a stretcher-roll, and connections between said stretcher-roll and the means bearing on the pattern-plate whereby the position of the said means on the said plate is varied.

8. In a machine for finishing or sealing hems of garments, the combination with the support for the garment, of an oscillating lever and connections for imparting an intermittent step-by-step movement to the support, a movable fulcrum for said lever, a sliding rod to which the same is connected, a pattern-plate, a projection on said sliding rod bearing against said pattern-plate, a stretcher-roll and connections between the same and said sliding rod whereby the position of said stretcher-roll determines the position of the projection on the pattern-plate.

9. In a machine for finishing or sealing garment-hems, the combination with mechanism for feeding adhesive material to the fold of the hem, of mechanism for pressing said fold, a rotating spindle for supporting the garment-hem, a spring-band encircling said spindle, means for intermittently causing said band to grip the rotary spindle, and means for giving said spring-band an intermittent oscillatory movement.

10. In a machine for finishing or sealing garment-hems, the combination with mechanism for feeding adhesive material to the fold of the hem, of mechanism for pressing said fold, a rotary spindle for supporting the garment-hem, a spring-band encircling said spindle, an oscillatory lever to which the ends of said band are attached, and means for causing said band to grip the spindle when the lever oscillates in one direction and to release the same when the lever oscillates in the opposite direction.

11. In a machine for finishing or sealing garment-hems, the combination with mechanism for feeding adhesive material to the fold of the hem, of mechanism for pressing said fold, a rotary spindle for supporting the garment-hem, a spring-band encircling said spindle, an oscillating lever to which the ends of said band are attached, a drive-shaft, connections between the drive-shaft and oscillating lever for giving the intermittent movement to said lever, a cam on said drive-shaft, and means controlled by said cam for causing the spring-band to grip the rotary spindle when the oscillating lever moves in one direction.

12. In a machine for finishing or sealing hems of garments, the combination with a rotary spindle for supporting the garment, a spring-wire encircling the same, an oscillating lever to which the ends of said wire are supported, means for giving said lever an intermittent oscillatory movement, a pivoted dog carried by said lever and engaging the free end of said wire, a drive-shaft, and connections between the same and said dog to cause it to grip the end of the wire to cause the same to rotate the support.

13. In a machine for finishing or sealing hems of garments, the combination with a rotary spindle for supporting the garment, of a spring-wire encircling the same, a main drive-shaft, cams on the same, a lever controlled by one of said cams for imparting an oscillatory movement to said wire, a plunger controlled by another of the cams on said shaft, and connections between said plunger and the wire for causing the latter to grip the rotary spindle when it moves in one direction.

14. In a machine for finishing or sealing hems of garments, the combination with a support for the garment, of means for feeding an adhesive substance to the hem of said garment, a carriage on which the same is mounted, a horizontal stud upon which said carriage is mounted to slide and to oscillate, and a latch for holding said carriage in its operative position.

15. In a machine for finishing or sealing hems of garments, the combination with a support for the garment, of mechanism for feeding an adhesive tissue to the same, a carriage for said mechanism, a horizontal stud on which the same is mounted to permit its sliding and oscillating thereupon, a latch for holding the carriage in its operative position, a stretcher-roll, and means controlled by the same for releasing said latch.

16. In a machine for finishing or sealing hems of garments, the combination with a support for the garment, of a holder for adhesive material, means for feeding said material to the fold of the garment-bottom, a support for said adhesive-material holder and feeding means, a horizontal stud upon which the same is mounted so as to slide and oscillate thereupon, and a pin on said stud and engaging segmental slots in said support for limiting the oscillation of said support.

17. In a machine for finishing or sealing the hems of garments, the combination with a support for the garment, of mechanism for feeding adhesive material to the fold thereof, a support for said feeding mechanism, a stud upon which the said support is mounted, a weighted handle, and toggle-links between said handle and the support, and a latch for holding said support in its operative position.

18. In a machine for finishing or sealing hems of garments, mechanism for feeding adhesive material to the fold of the garment comprising feeding-rollers, a spirally-grooved drum connected thereto, a reciprocating cross-head, and a pivoted dog on the same for engaging the spiral groove in said drum.

19. In a machine for finishing or sealing hems of garments, gum-tissue-feeding mechanism comprising tongs composed of two pivoted members, the lower member of which is provided with an upturned flange provided with sharp edges and the upper member working against said edges whereby the gum-tissue is sheared, and means for opening and closing said tongs.

20. The mechanism for feeding adhesive substance to the fold of garments comprising a reciprocating cross-head, tongs secured thereto, a pivoted dog secured to said cross-head and adapted to engage the upper member of the tongs to open the same, fixed stops for actuating said dog at both ends of the movement of the cross-head, and a projection on said tongs engaging a similar fixed projection for closing said tongs.

21. In a machine for finishing or sealing hems of garments, gum-tissue-feeding mechanism comprising feeding-rollers and tongs, a spirally-grooved drum attached to said rollers, a reciprocating cross-head to which said tongs are secured, a pivoted dog on said cross-head for engaging the spirally-grooved drum, a pivoted dog also secured to said cross-head for opening the tongs, and fixed stops for engaging said last-named dog at both ends of the movement of the cross-head.

22. In a machine for finishing or sealing hems of garments, gum-tissue-feeding mechanism comprising feed-rollers, means for giving the same an intermittent rotary movement, combined shears and tongs, means for closing the same to cut off the tissue and grasp the same, and means for giving said tongs a to-and-fro movement to carry the same into the fold of the garment.

23. In a machine for finishing or sealing hems of garments, the combination with a support for the garment, of means for giving the same an intermittent step-by-step movement, of rollers bearing on opposite sides of the fold, and means for releasing the bite of said rollers on the fold when the support is fed forward.

24. In a machine for finishing or sealing hems of garments, the combination with a support for the garment, means for giving the same an intermittent step-by-step movement, rollers bearing on the inside and outside of the fold, means for releasing the bite of said rollers on the fold, a sponge-cup and means for simultaneously pressing the sponge against the same at each intermittent movement of the support for the said garment.

25. In a machine for finishing or sealing hems of garments, the combination with a support for the garment, of a roller bearing on the inside of said garment, a rocking frame on which the same is supported, a reciprocating rod and connections between the same and said rocking frame.

26. In a machine for finishing or sealing hems of garments, the combination with a support for the garment, of the biting-rolls and sponge-cup, a rocking frame in which the former are mounted, a lever for moving the sponge-cup, a reciprocating rod and connections between the same and the lever and rocking frame for simultaneously pressing the sponge against the garment and releasing the bite of the rollers on the same.

In testimony whereof I, the said LEOPOLD NEWMAN, have hereunto set my hand.

LEOPOLD NEWMAN.

Witnesses:
ROBERT C. TOTTEN,
F. W. WINTER.